Nov. 18, 1958 K. M. MAIERSHOFER 2,860,559
SHUTTER COCKING MECHANISM
Filed Nov. 16, 1955
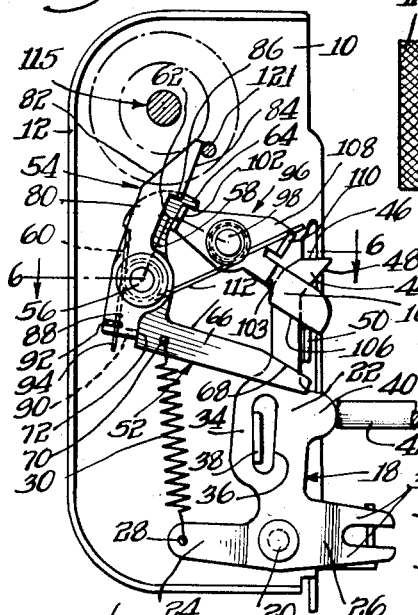
Fig. 1.
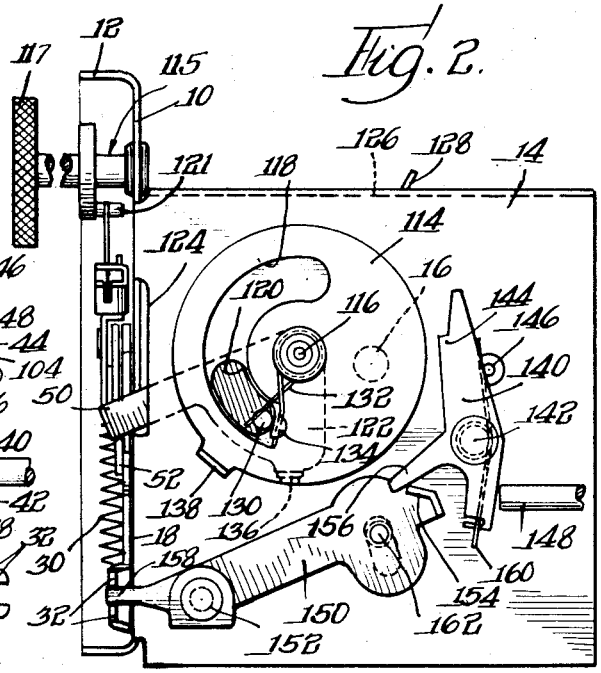
Fig. 2.
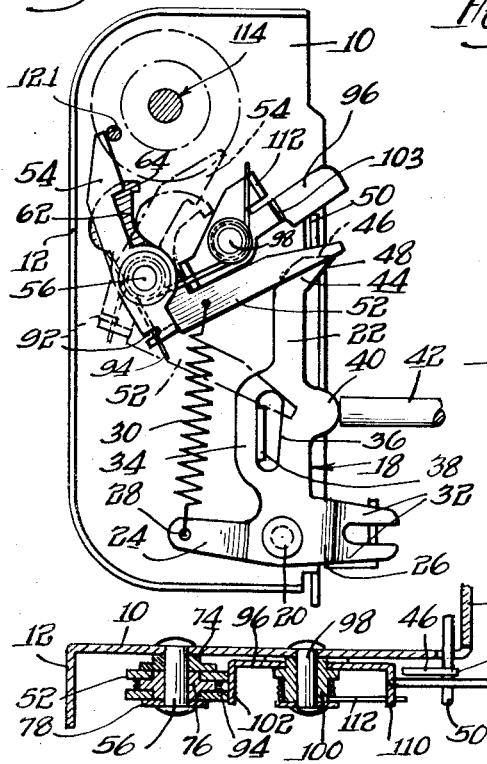
Fig. 3.
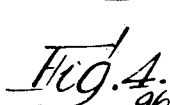
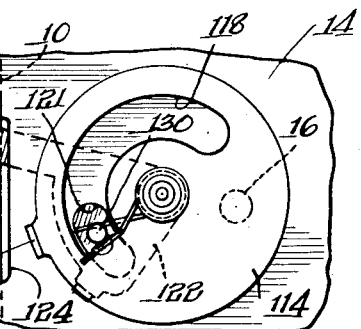
Fig. 4.
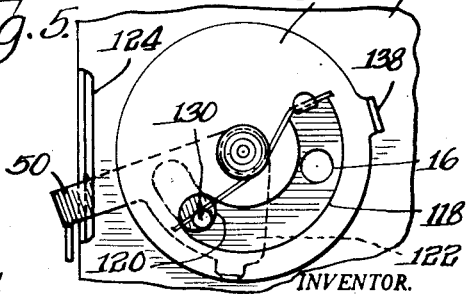
Fig. 5.
Fig. 6.
INVENTOR.
Karl M. Maiershofer
BY: Olson & Trexler
attys

United States Patent Office 2,860,559
Patented Nov. 18, 1958

2,860,559

SHUTTER COCKING MECHANISM

Karl M. Maiershofer, Norridge, Ill., assignor to G-M Laboratories Inc., Chicago, Ill., a corporation of Illinois Application November 16, 1955, Serial No. 547,086

4 Claims. (Cl. 95—31)

This invention is concerned generally with the photographic art, and more particularly with a control mechanism for photographic shutters.

Among the many photographic shutters which now are on the market, or have been on the market in the past, there are shutters which require cocking, and there are self-setting shutters which do not require cocking. The former type of shutter generally is more versatile, but generally is found only on the more expensive cameras. When such shutters must be cocked manually, one extra operation is introduced which is likely to be forgotten by the novice photographer, or even overlooked by a more experienced photographer when pictures must be taken rapidly. Thus, on expensive and complicated cameras mechanism often has been incorporated for cocking the shutter when the film is advanced. Such mechanisms insure against the making of double exposures inasmuch as the shutters generally cannot be cocked except by advancing the film, and an exposure cannot be made until after a shutter has been cocked.

Shutters which must be cocked, often called set and release shutters, and double exposure prevention devices generally have been denied to the users of inexpensive cameras simply as a matter of economics. In view of this, it is an object of this invention to provide an inexpensive operating or control mechanism for an inexpensive shutter which cocks the shutter upon winding of the film.

Another object of this invention is to provide a camera shutter control mechanism cooperable with a film winding mechanism in a novel and improved manner for operating the control mechanism upon movement of the film winding mechanism to condition the control mechanism for making an exposure.

It is a further object of this invention to provide a camera shutter control mechanism which is rugged, and yet which is of simple and economical construction.

Other and further objects and advantages of the present invention will be apparent from the following description when taken in connection with the accompanying drawings wherein:

Fig. 1 is a plan view of the shutter control mechanism;

Fig. 2 is a plan view of a shutter which may be controlled thereby as taken from the right side of Fig. 1 and at right angles thereto;

Fig. 3 is a view similar to Fig. 1 with the parts in a different position;

Fig. 4 is a view of the shutter mechanism similar to Fig. 2 showing the shutter in cocked position;

Fig. 5 is a view similar to Fig. 2 showing the shutter during an exposure; and

Fig. 6 is a horizontal sectional view through the control mechanism as taken substantially along the line 6—6 in Fig. 1.

Referring now in greater particularity to the drawings, there will be seen an end plate 10 having an integral reinforcing flange 12 extending at right angles thereto and lying along three edges of the end plate. At the fourth edge of the end plate there is provided an integral shutter or exposure plate 14 having an aperture 16 therein alignable with a camera lens (not shown). All of the shutter control mechanism is mounted on the end plate 10 and includes a shutter release lever generally designated by the numeral 18 pivotally mounted on the plate by means of a stud 20. The shutter release lever 18 is of generally inverted T-shape including a stem 22 and a pair of arms 24 and 26. The cross arm 24 is provided with an aperture 28 forming an anchor for a tension spring 30 urging the shutter release lever clockwise. The opposite cross arm 26 is bifurcated, being provided with a pair of parallel, spaced apart fingers 32 cooperable with a member hereinafter to be set forth.

The stem 22 of the shutter release lever 18 is provided near its mid section with an enlargement 34 having a vertically elongated slot 36 therein. A flange 38 extending from the end plate 10 is received in the slot 36 and limits pivotal movement of the shutter release member 18. The flange 38 normally limits the clockwise pivoted position as urged by the spring 30, but allows limited movement in a counterclockwise direction against the force of the spring 30 as hereinafter will be brought out. More specifically, a protuberance 40 is provided on the opposite side of the stem from the enlargement, and a push rod 42 or the like engages the protuberance. The push rod is connected to or formed integral with a shutter release member or button (not shown) mounted exteriorly of the camera body (also not shown). The upper end of the stem 22 is displaced to the right as is indicated at 44, thus providing a squared off retaining edge 46, and an oblique cam surface 48 beneath the retaining edge. The retaining edge 46 is designed for cooperation with a shutter member or arm 50, the specific construction of which hereinafter will be set forth, for holding a shutter in cocked position. It will be apparent that forces exerted by the shutter on the edge 46 urge the stem 22 toward the pivot 20, and thereby do not exert any substantial pivoting forces on the shutter release lever.

The shutter control mechanism also includes a shutter cocking intermediate lever 52 and a shutter cocking pawl 54 mounted on a common pivot 56 on the end plate 10. The shutter cocking intermediate lever 52 is generally L-shaped, having an upwardly extending arm 58 receiving the pivot 56. The left side of the upwardly extending arm 58 is provided with a recess or depression 60 providing a spring anchor, while the right side of the arm is provided with an abutment edge 62 having a laterally extending finger or detent 64 immediately above it. The shutter cocking intermediate lever also includes a laterally extending arm 66 having an oblique edge 68 near the outer end thereof. The arm 66 is provided with an aperture 70 near the apex of the lever forming an anchor for the spring 30, which tends to pivot or rotate the lever 52 in a clockwise direction. Substantially at the heel or apex of the lever 52, the upwardly extending arm 58 is provided with an abutment edge 72.

As may be seen in Fig. 6, there is a spacer 74 positioned between the shutter cocking intermediate lever 52 and the end plate 10. Thus, the lever 52 is spaced sufficiently from the end plate 10 for the laterally extending arm 66 to be positioned outwardly of the stem 22 of the shutter release lever 18. An intermediate spacer 76 is mounted between the shutter cocking intermediate lever 52 and the shutter cocking pawl 54, and thus spaces the pawl outwardly from the intermediate lever, the pawl, lever, and spacers being held on the stud forming the pivot 56 by a retaining washer 78 and a peened over or riveted outer end on the stud.

The shutter cocking pawl 54, as may be seen in Fig. 1, comprises an upwardly extending arm 80 having a cam surface 82 on the left edge thereof. There is an abutment edge 84 on the right side of the arm 80, and an internal shoulder 86 is provided directly below the abutment edge 84. The internal shoulder is aligned with the lower edge of the finger or detent 64 on the intermediate lever. At the opposite end or tail 88 of the pawl there is a right angularly disposed flange 90 bearing against the abutment edge 72 of the intermediate lever 52, and there is also a slot 92 forming a spring anchor. A spring 94 is wrapped around the intermediate spacer 76 (Fig. 6) and the opposite ends thereof bear in the recess or depression 60 of the intermediate lever upper arm 58 and in the recess 92 in the tail of the pawl. This spring tends to pivot the pawl in a counterclockwise direction relative to the intermediate lever 52, but such pivoting is limited by engagement of the flange 90 with the abutment edge 72 of the intermediate lever.

The shutter control mechanism also includes a stop lever 96 pivotally mounted on a stud 98 by means of a sleeve or collar 100 (Fig. 6). The left arm of the stop lever is provided with a right angularly disposed, outwardly extending flange 102 engageable with the abutment edge 62 of the intermediate lever and engageable on the edge of the finger 64 of the intermediate lever 52. The right-hand end of the stop lever is provided with an offset 103 and an outwardly displaced section 104 overlying the tip 44 of the stem 22 of the shutter release lever, and the outwardly offset section 104 has an operating edge 106 engageable with the shutter member 50. A stub arm 108 on the stop lever is provided with an outwardly directed flange 110. A coil spring 112 encircles the sleeve or collar 100 and has one end bearing against the flange 110, with the other end curled around the spacer 76 on the pivot 56 whereby resiliently to urge the stop lever 96 in a clockwise direction.

Part of a film winding mechanism 115 (Figs. 1 and 2) is mounted on the end plate 10 and is operatively connected with a film winding knob 117 disposed outside of the camera body. This knob conveniently is knurled or serrated for ready gripping by the fingers. The film winding mechanism includes a flange having one or more axially extended pins 121 mounted thereon in position to abut the abutment or actuating edge 84 of the shutter cocking pawl. The number of pins depends upon the degree of rotation necessary to advance the film from one frame to another. Thus, when the film winding mechanism is turned in a clockwise direction as viewed in Fig. 1, the pin 121 engages the pawl to pivot the pawl and intermediate lever in a counterclockwise direction to the solid line position shown in Fig. 3. The oblique edge 68 of the laterally extending arm 66 of the intermediate lever raises the shutter member 50, the shutter member 50 camming the release lever 18 momentarily in a counterclockwise direction by engagement with the cam surface 48. Continued rotation of the film winding mechanism causes the pin 121 to leave the pawl 54, and the spring 30 then moves the pawl and intermediate lever to the dashed line position shown in Fig. 3, such position being limited by engagement of the intermediate lever 52 against the flange 38, or by dead centering of the spring anchors 28 and 70 with the pivot 56.

The shutter member 50 is spring urged downwardly, and when the shutter release lever 18 is pivoted in a counterclockwise direction by movement of the push rod 42 upon depression of the shutter release button or the like, the shutter member 50 is released by the engaging edge 46 of the tip 44. The member 50 then descends rapidly, and the stop lever 96 is returned toward its initial position by the spring 112, reaching such position upon release of the shutter release lever 18. The flange 102 on the stop lever engages the edge 62 of the intermediate lever 52, and pivots this lever back up to its initial position as shown in solid lines in Fig. 1. The finger 64 prevents overtravel of the stop lever 96. Usually, the pawl at this time will be in position to be picked up by the pin 121 upon a subsequent film winding operation. However, it is possible that a pin might stop in a position where it would be engaged by the beveled or cam edge 82 of the pawl. In this case, the intermediate lever still returns to its normal position, but the pawl remains pivoted somewhat in a clockwise direction from its normal position by virtue of the pin 121 and yielding of the spring 94. It is for this reason that the pawl comprises a spring biased part movable with the intermediate lever, rather than comprising an integral extension of the intermediate lever. Upon a subsequent film winding operation the pin 121 will pass from the edge 82, and the pawl will return to its normal position as shown in solid lines in Fig. 1 where it can be picked up by a pin 121 as the film winding operation is completed. The film winding mechanism stops in a random position inasmuch as the position of the film is determined visually by observing the numbers on the back thereof through the usual colored window in the back of a camera body (not shown). The offset 103 serves as a stop for shutter release lever 18 to indicate that the shutter needs cocking. It can also prevent other auxiliary functions such as closing of flash contacts before the shutter is cocked.

Although it is contemplated that the shutter control mechanism as heretofore shown and described could be used with any of a variety of shutters, a specific shutter is hereinafter described by way of illustrative example. Thus, referring to Figs. 2, 4 and 5, there is provided a shutter disc 114 pivotally mounted at 116 on the shutter or exposure plate 14. The shutter disc 114 is provided with an arcuate slot 118 of approximately 180 degrees extent. The shutter disc normally covers the exposure aperture 16, but upon pivoting of the disc the slot 118 is brought into alignment with the aperture to make an exposure.

A short, arcuate slot 120 is provided in the plate 14 in alignment with the exposing slot 118. Behind the slot 120, on the back side of the plate 14, there is provided a segmental shaped shutter cocking lever 122 having a radial extension along one edge in the form of an arm comprising the previously mentioned member 50, this arm projecting through a vertically elongated slot 124 at the junction of the plates 10 and 14. The shutter cocking lever 122 is pivotal about the pivot 116 and is urged in a counterclockwise direction by a spring wound about the pivot and engaging the shutter cocking lever 122 and also engaging in a slot (not shown) in a horizontal flange 126 along the top edge of the shutter plate 14. A plurality of slots is provided in this flange for adjusting the tension on the shutter cocking spring, and the upper end of the spring is illustrated at 128 where it projects through the notch or aperture in the flange 126.

A stud 130 on the shutter cocking lever extends through the short arcuate slot 120 and limits downward movement of the shutter cocking lever by engaging the lower end of the slot 120. A nylon or other non-metallic sleeve preferably encircles the stud 130 to prevent the noise engendered by metal-to-metal contact. A spring 132 coiled about the pivot 116 engages the back side of the stud 130 and also engages a curled-over ear 134 at the leading edge of the shutter disc slot 118 to hold the meeting edge of the shutter disc slot up against the stud 130. The spring 132 is a very light one, and its only function is to hold the leading edge of the slot against the stud 130. It will be observed that there is a flash contact 136 carried at the bottom of the shutter cocking lever 122.

The shutter disc 114 has an axially directed flange 138 on the edge thereof. A time lever 140 is pivotally mounted at 142 on the shutter plate 14, and is provided with an internal shoulder 144 adapted to catch the flange 138 for effecting a time exposure. Normally, the time lever is held back, out of catching position, against a stop 146 by means of a slide 148 connected to an externally accessible mechanism for setting the shutter for time or instantaneous exposures. The lever also is held against the stop 146 by a time release lever 150 pivoted on the plate 14 at 152. An upstanding flange 154 on the time release lever engages beneath a side arm 156 on the time release lever 140. The tail 158 of the time release lever 150 is received between the fingers 32 of the shutter release lever, and normally is held in the solid line position shown in Fig. 2, the time lever being held in retracted position against the stop 146. Upon pivoting of the shutter release lever, the time release lever also pivots in a clockwise direction, and a spring 160 on the time lever pivots the time lever away from the stop 146 if the slide 148 also is retracted.

It previously has been explained that the shutter cocking intermediate lever 52 raises the shutter cocking lever arm 50 upon winding of the film, and that the arm 50 is held in raised position by the tip 44 of the lever 18. This effects tensioning of the shutter spring 128 and moves the stud 130 upwardly in the arcuate slot 120 generally to the position illustrated in Fig. 4. It will be seen in this figure that the leading edge of the shutter disc slot 118 is held against the stud by the light spring 132. When the arm 50 is released by pivoting of the shutter release lever 18, as heretofore described, the shutter cocking lever moves downwardly at a rapid rate under the influence of the spring 128, carrying the shutter disc 114 with it, until the stud hits the lower end of the slot 130. The stud and the shutter cocking lever then stop suddenly, and the disc 114 continues in motion by virtue of its own inertia until the trailing edge of the slot 118 hits the stud 130. This causes the shutter disc to bounce back from the stud to the initial position shown in Fig. 2. In Fig. 5 it will be appreciated that the slot 118 is aligned with the exposure aperture 16 during a portion of the initial forward movement of the shutter disc, and during the corresponding portion of the return motion.

If the slide 148 has been withdrawn, pivoting of the time release lever 150 allows the shoulder 144 to move into position to catch the flange 138, somewhat in the position shown in Fig. 5 with the disc slot aligned with the exposure aperture. The exposure then continues until the shutter release push button or the like is allowed to return to its initial position. At this time the time release member 150 is pivoted back to the position shown in Fig. 2, and the time lever retracted from the flange 138. The light spring 132 then serves its normal function of holding the leading edge of the slot of the disc against the stud, and completion of the exposure is made thereby.

It will be observed that in the particular shutter shown and described there is a stud 162 on the back of the time release lever extending through a slot 164 in the shutter plate 14. This stud actuates a flash contact mechanism (not shown) on the back side of the plate 14 so that the mechanism is positioned for engagement by the flash contact 136 previously mentioned.

From the foregoing it will be appreciated that the shutter control mechanism herein shown and described is of simple and economical construction, and yet is quite rugged. The control mechanism cooperates with film winding mechanism in a novel and efficient manner, and serves to cock a shutter. Thus, it is impossible to make a double exposure.

It will be understood that the control mechanism could be used with a great variety of shutters in addition to the one specifically shown, and that the specific structure of the control mechanism itself is shown only by way of illustration. Various changes in structure will no doubt occur to those skilled in the art, and are to be understood as forming a part of this invention insofar as they fall within the spirit and scope of the appended claims.

The invention is claimed as follows:

1. In a camera of the type using unperforated roll film and having a film wind mechanism and a shutter having a resiliently biased part, a shutter control mechanism comprising a base, a shutter release lever, pivot means pivotally mounting said lever on said base with a side of said lever adjacent said shutter part, means resiliently biasing said shutter release lever towards said shutter part, a cam surface on said shutter release lever whereby said shutter part can be moved past the end of said lever by camming the same aside, a retaining edge on said lever for retaining said shutter part in cocked position resiliently urged longitudinally of said lever substantially radially of said pivot means, an L-shaped lever pivotally mounted on said base with an arm adjacent said shutter part for moving the same past said shutter release lever including the cam edge thereof, a stop lever pivotally mounted on said base and normally holding said L-shaped lever in position for engaging said shutter part, said stop being engaged by said shutter part and pivoted away from said L-shaped lever upon movement of said shutter part to cocked position whereby said L-shaped lever is free to move away from said shutter part, and a pawl pivotally mounted on said L-shaped lever and resiliently urged to a limit in a given direction relative to said L-shaped lever with said pawl in position for engagement by said film advance means to pivot said pawl and L-shaped lever as a unit for moving said shutter part into cocked position, and means for pivotally moving said shutter release lever to release said shutter part.

2. In a camera of the type using unperforated roll film and having a film wind mechanism and a resilient shutter part, a camera shutter control mechanism comprising means retaining said shutter part in cocked position against its resilient bias, a lever engageable with said shutter part to move it into such cocked position, a pawl pivotally mounted on said lever and resiliently biased for pivotal movement relative to said lever to a predetermined limit with said pawl in position for engagement by said film wind mechanism whereby operation of said film wind mechanism will pivot said lever to move said shutter part to cocked position, said lever being resiliently biased away from the shutter part, and a movable stop member comprising a pivotally mounted lever holding said first mentioned lever substantially in the vicinity of said shutter part for engaging therewith upon pivoting of the lever, said stop lever being engaged by said shutter part upon cocking thereof for pivoting said stop lever away from the first mentioned lever following cocking of said shutter part to allow said first mentioned lever to pivot a substantial distance away from said shutter part.

3. In a camera having a film wind mechanism and a resiliently biased shutter part, a camera shutter control mechanism comprising means retaining said shutter part in a cocked position against its resilient bias, said retaining means comprising a pivoted arm, a lever engageable with said shutter part for moving said shutter part into such cocked position, means operatively connected to said film winding mechanism for pivoting said lever to move said shutter part to cocked position upon operation of said cocking mechanism, manually operable means for moving said retaining means from said shutter part to allow movement of said shutter for effecting an exposure, and intermediate means controlled by said lever preventing movement of said moving means prior to operation of said film winding mechanism, the movement preventing means controlled by the lever comprising a stop engageable by said pivoted arm.

4. A shutter control mechanism as set forth in claim 3 wherein the stop comprises an offset in the member.

References Cited in the file of this patent

UNITED STATES PATENTS

| | | |
|---|---|---|
| 1,563,463 | Belugou | Dec. 1, 1925 |
| 2,301,956 | Kuppenbender | Nov. 17, 1942 |
| 2,587,447 | Durst | Feb. 26, 1952 |
| 2,664,799 | Wilkinson | Jan. 5, 1954 |

FOREIGN PATENTS

| | | |
|---|---|---|
| 573,910 | Great Britain | Dec. 12, 1945 |